(12) United States Patent
Hadley et al.

(10) Patent No.: US 12,235,768 B2
(45) Date of Patent: Feb. 25, 2025

(54) METHODS AND APPARATUS FOR PROCESSING PREFETCH PATTERN STORAGE DATA

(71) Applicant: Arm Limited, Cambridge (GB)

(72) Inventors: Scott Courtland Hadley, Austin, TX (US); Devin S. Lafford, Austin, TX (US); Alexander Cole Shulyak, Austin, TX (US)

(73) Assignee: Arm Limited, Cambridge (GB)

( * ) Notice: Subject to any disclaimer, the term of this patent is extended or adjusted under 35 U.S.C. 154(b) by 47 days.

(21) Appl. No.: 18/350,135

(22) Filed: Jul. 11, 2023

(65) Prior Publication Data

US 2025/0021483 A1 Jan. 16, 2025

(51) Int. Cl.
*G06F 12/00* (2006.01)
*G06F 12/0862* (2016.01)

(52) U.S. Cl.
CPC .. *G06F 12/0862* (2013.01); *G06F 2212/6024* (2013.01)

(58) Field of Classification Search
CPC ............ G06F 12/0862; G06F 2212/6024
USPC ................................................ 711/213
See application file for complete search history.

(56) References Cited

U.S. PATENT DOCUMENTS

| | | | |
|---|---|---|---|
| 4,581,710 A * | 4/1986 | Hasselmeier | G06K 15/10 358/1.7 |
| 7,149,044 B1 * | 12/2006 | Chen | G11B 5/59677 360/77.02 |
| 11,599,473 B1 | 3/2023 | Lafford et al. | |
| 2018/0018266 A1 * | 1/2018 | Jones, III | G06F 12/0811 |
| 2020/0004551 A1 * | 1/2020 | Vasekin | G06F 9/3861 |
| 2024/0296372 A1 * | 9/2024 | Srivastava | G06N 20/00 |

FOREIGN PATENT DOCUMENTS

| | | | | |
|---|---|---|---|---|
| WO | WO-2018033035 A1 * | 2/2018 | | G06F 3/06 |
| WO | WO-2020049666 A1 * | 3/2020 | | G06F 16/2237 |

OTHER PUBLICATIONS

S. Somogyi et al., "Spatial Memory Streaming", 33rd International Symposium on Computer Architecture (ISCA '06), Boston, MA, USA, Jun. 2006, 12 pages, DOI: 10.1109/ISCA.2006.38.

* cited by examiner

*Primary Examiner* — Mardochee Chery
(74) *Attorney, Agent, or Firm* — NIXON & VANDERHYE P.C.

(57) ABSTRACT

Aspects of the present disclosure relate to an apparatus comprising prefetch pattern storage circuitry and pattern training circuitry. The pattern training circuitry detects patterns of data access for updating one or more corresponding pattern storage entries. The pattern training circuitry comprises a plurality of training entries, associated with a given accessed storage location. Each said training entry comprises a plurality of regions. For a given training entry, at least one region is configured to store information for which a subsequent access offset is positive, and at least one region is configured to store information for which said offset is negative. The pattern training circuitry is configured to transmit data indicative of said information to the prefetch pattern storage circuitry. The prefetch pattern storage circuitry is responsive to receiving said transmitted data to update at least one corresponding pattern storage element.

20 Claims, 7 Drawing Sheets

METHODS AND APPARATUS FOR PROCESSING PREFETCH PATTERN STORAGE DATA

BACKGROUND

The present technique relates to the field of processing circuitry, and in particular to prefetching within such circuitry. In general, a data processing circuitry executes processing operations on data retrieved from a storage. A given processing circuitry may have access to multiple storages. For example, data/instructions may be stored in a memory such as a random access memory (RAM). For efficiency of processing, a processing circuitry may also have one or more caches, which have a smaller capacity than the memory, but which are faster to access. Data/instructions which are likely to be required for future processing operations can be temporarily stored in such a cache, in order to reduce the latency associated with their subsequent retrieval.

Prefetching is a process by which predictions can be made as to accesses which will be required, prior to the execution of a given instruction which will actually take given data as an input. Such predicted data/instructions can be prefetched into a cache, in order that it is ready for rapid access when the instruction is executed.

Various methods exist for performing the aforementioned predictions. For example, patterns of access may be observed and extrapolated into the future. Inaccurate predictions can lead to twofold impacts on performance: resources associated with the prediction process (in terms of processing e.g. silicon area, power, and time) are wasted, and also incorrectly predictions take up cache space, reducing the overall utility of the prefetching process.

There is therefore a desire for improved methods and apparatus for prefetching.

SUMMARY

At least some examples provide an apparatus comprising:
prefetch pattern storage circuitry comprising a plurality of pattern storage entries, wherein each pattern storage entry:
  is associated with respective storage location information; and
  comprises a plurality of confidence values, each confidence value being representative of a confidence associated with an expected data access to a storage location having a respective offset relative to the respective storage location information, said expected data access being subsequent to a storage access corresponding to the respective storage location information,
pattern training circuitry to detect patterns of data access and to provide information representative of said detected patterns to the prefetch pattern circuitry for updating one or more corresponding pattern storage entries, wherein:
  the pattern training circuitry comprises a plurality of training entries, each training entry being associated with information indicative of a given accessed storage location; and
  each said training entry comprises a plurality of regions, each region comprising a plurality of elements, each said element being associated with a given storage location having a respective offset relative to the given accessed storage location and being configured to store information tracking accesses to said given storage location, said respective offsets comprising offsets from a given lowest offset to a given highest offset, wherein:
    for a given training entry, at least one region is configured to store information for which said offset is positive, and at least one region is configured to store information for which said offset is negative; and
  the pattern training circuitry is configured to transmit data indicative of said information to the prefetch pattern storage circuitry; and
  the prefetch pattern storage circuitry is responsive to receiving said transmitted data to update at least one corresponding pattern storage element.

Further examples provide a method comprising:
storing, by prefetch pattern storage circuitry, a plurality of pattern storage entries, wherein each pattern storage entry:
  is associated with respective storage location information; and
  comprises a plurality of confidence values, each confidence value being representative of a confidence associated with an expected data access to a storage location having a respective offset relative to the respective storage location information, said expected data access being subsequent to a storage access corresponding to the respective storage location information, detecting, by pattern training circuitry, patterns of data access, wherein:
  the pattern training circuitry comprises a plurality of training entries, each training entry being associated with information indicative of a given accessed storage location; and
  each said training entry comprises a plurality of regions, each region comprising a plurality of elements, each said element being associated with a given storage location having a respective offset relative to the given accessed storage location and being configured to store information tracking accesses to said given storage location, said respective offsets comprising offsets from a given lowest offset to a given highest offset, wherein:
    for a given training entry, at least one region is configured to store information for which said offset is positive, and at least one region is configured to store information for which said offset is negative;
  transmitting data indicative of said information from the pattern training circuitry to the prefetch pattern storage circuitry; and
  responsive to receiving said transmitted data at the prefetch pattern storage circuitry, updating at least one corresponding pattern storage element.

Further examples provide a non-transitory computer-readable medium to store computer-readable code for fabrication of an apparatus as described above.

Further aspects, features and advantages of the present technique will be apparent from the following description of examples, which is to be read in conjunction with the accompanying drawings.

DESCRIPTION OF EXAMPLES

Figure 1:
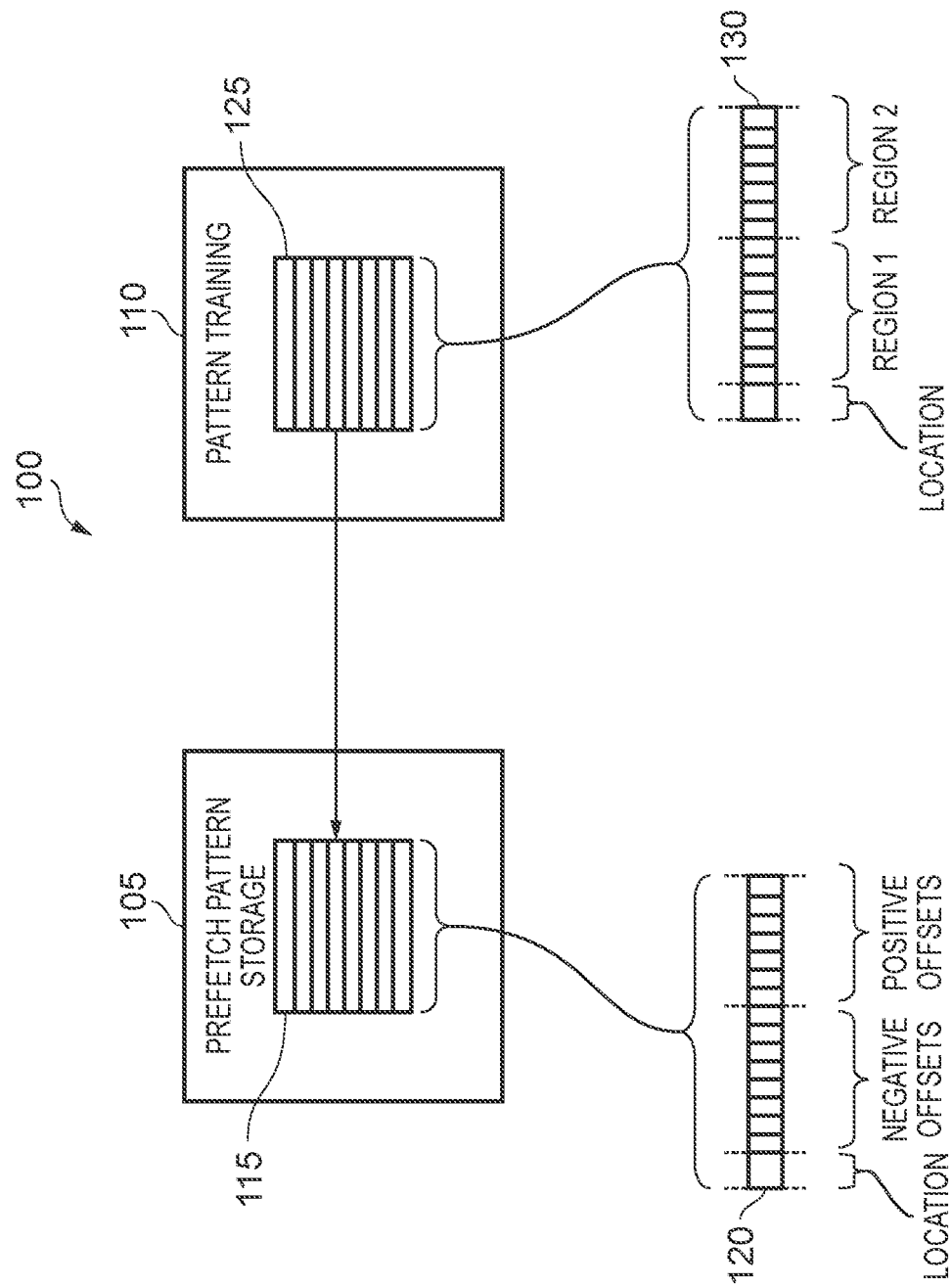
FIG. 1 schematically depicts an apparatus according to an example.

Examples of the present disclosure provide an apparatus comprising prefetch pattern storage circuitry, and pattern training circuitry. The apparatus may be part of a processing circuitry, such as a central processing unit (CPU) or graphics processing unit (GPU). In general, the prefetch pattern storage circuitry keeps track of observed patterns of access to one or more storages. These patterns of access can be used to predict future access, based on which predicted data or instructions can be prefetched. The prefetch pattern storage circuitry may for example implement a pattern history table.

The pattern training circuitry is used to detect the aforementioned data access, and to provide information representative of the detected patterns to the prefetch pattern storage circuitry. The pattern training circuitry may implement a training table.

Thus, the pattern training circuitry is used for short-term detection of patterns of data access, whilst the prefetch pattern storage circuitry is used for longer term storage of detected patterns (based on which prefetching operations can be performed). Over time, the prefetch pattern storage circuitry is updated based on the pattern training circuitry.

More specifically, the prefetch pattern storage circuitry comprises a plurality of pattern storage entries. Each pattern storage entry is associated with respective storage location information. For example, the storage location information may be a program counter (PC) tag, indicative of a given program counter value (i.e. an address associated with a current processing instruction of a series of processing instructions comprising a program).

Each pattern storage entry comprises a plurality of confidence values, each of which is representative of a confidence associated with an expected data access to a storage location having a respective offset relative to the storage location associated with the location information. The expected data access is subsequent to a storage access corresponding to the respective storage location information.

The aforementioned offsets may for example comprise a number of positive offsets as well as a number of negative offsets. The confidence values may be such that a high value indicates a high likelihood of subsequent access to a storage location with a given offset (after an access to the location associated with the location information), and a low value indicates a low likelihood of access to that offset. The prefetch pattern storage circuitry thus stores the expected likeliness of given storage accesses following an access to a particular location, based on which prefetching can be performed.

As mentioned above, the pattern training circuitry is configured to detect patterns of data access and to provide information representative of said detected patterns to the prefetch pattern circuitry for updating one or more corresponding pattern storage entries.

The pattern training circuitry comprises a plurality of training entries, each training entry being associated with information indicative of a given accessed storage location (e.g. a given program counter tag and/or storage address).

Each such training entry comprises a plurality of regions. Each region in turn comprises a plurality of elements, with each element being associated with a given storage location having a respective offset relative to the given accessed storage location. For example, each training element may be associated with a given cache line, wherein an access to an address within that cache line is deemed to be an access associated with the respective associated offset.

Thus, each training entry has a range of associated offsets, somewhat analogously to the range of offsets associated with a given pattern storage entry of the prefetch pattern storage circuitry but differing by way of their grouping into regions.

Each element is configured to store information tracking accesses to its corresponding associated storage location. For example, it may track a frequency of such accesses. The aforementioned offsets for a given entry comprise offsets from a given lowest offset to a given highest offset. The range of offsets from lowest to highest may encompass a full number of negative and positive offsets stored by a given pattern storage entry. Thus, a given training entry in such an example can cover the complete range of offsets that is covered by a given pattern training entry, thereby providing a full picture of accesses to each offset.

For a given training entry, at least one region is configured to store information for which said offset is positive, and at least one region is configured to store information for which said offset is negative. Each entry can thus track accesses to a range of positive and negative offsets relative to a given storage location.

The pattern training circuitry is further configured to transmit data indicative of the stored information to the prefetch pattern storage circuitry, which is responsive to receiving said transmitted data to update at least one corresponding pattern storage element. For example, this transmitting may be performed at the end of a training period during which the pattern training circuitry tracks accesses.

The present apparatus thus provides an effective way of tracking and updating confidence values associated with accesses subsequent to accesses to given locations, based on which effective prefetching can be performed. As explained in more detail below, the use of a plurality of regions within a given training entry of the pattern training circuitry allows for improved performance relative to comparative examples which do not implement the present example.

By way of illustration, a comparative example may implement an aligned pattern training circuitry, in which each training entry tracks a fixed-size, aligned region of memory which contains the given storage location corresponding to that entry. This is relatively efficient in terms of hardware complexity: training entries can be tagged with the upper bits of the address of the associated storage location, and a subsequent storage access can be considered to match the training entry if the upper bits of its address match the tag of the training entry. Further, the lower bits of the address can be used as an index to update an offset, without complex logic. However, a significant disadvantage of this approach is that only a subset of the offsets of a given prefetch pattern storage entry can be tracked. For example, if the initial access (i.e. the given storage location associated with a particular entry) was to the first cache line of a particular region, a number of cache lines in the positive direction could be tracked, but no cache lines in the negative direction could be tracked, because they would fall within a different region. This is a consequence of the aligned nature of the memory regions tracked by this comparative example. For the same reason, large offsets are much less likely to be tracked: only offsets falling within the same region could be tracked, but large offsets would be more likely to fall within an adjacent region. This means that the confidence for those offsets is much less accurate.

By contrast with this comparative example, the above-described example of the present disclosure provides a pattern training circuitry which is configured to track a plurality of regions within a given entry. This allows a relatively wide range of positive and negative offsets to be tracked for a given training entry, whilst also providing efficient resource usage.

In an example, each of the plurality of regions, for a given training entry, corresponds to a respective adjacent aligned storage region (e.g. an aligned memory region), including a central storage region which comprises the given accessed storage location. The training entry regions include a central region, at least one lower region, and at least one higher region. The central region corresponds to offsets within the aforementioned central aligned storage region. Each of the at least one lower region corresponds to negative offsets falling within a respective lower aligned storage region. Each of the at least one higher region corresponds to positive offsets within a respective higher aligned storage region. For example, a given training entry may have three regions, i.e. a central region, one lower region and one higher region. In another example, a given training entry may have a central region, two lower regions and two higher regions, for a total of five regions.

Thus, in this example, the efficiencies of tracking accesses within aligned regions (per the comparative example above) are maintained, whilst also ensuring that a full range of positive and negative offsets can be tracked for each training entry. As a consequence, a lack of recordal at a given offset can be assured to be because there were no accesses to that offset. In the comparative example, in contrast, a lack of recordal in a given offset could also be because that offset fell outside the tracked region. Overall tracking accuracy is thereby significantly improved.

This example may be implemented within the pattern training circuitry by way of multiple storage structures. For example, the pattern training circuitry may comprise a first storage structure for storing elements of the central region, a second storage structure for storing elements of the lower region, and a third storage structure for storing elements of the higher region. These storage structures may be operable to be accessed in parallel across different entries, thereby reducing the risk of an access bottleneck if there is an overlap between training entries (for example if a lower region of one entry was the same as a higher region of another entry).

In another example, each training entry comprises two regions: a central region and an overflow region. The central region corresponds to offsets within a central aligned storage region comprising the given accessed storage region (i.e. similar to the central region of the previous example). The overflow region corresponds to offsets which fall within a lower or higher aligned storage region adjacent to the central aligned storage region. The overflow region thus includes the relevant offsets within both the lower region and the higher region of the previous example. Effectively, the present example wraps around the relevant offsets of the lower and higher regions of the previous example into a single region. This allows each training entry to comprise two regions, without loss of capacity relative to the previous example with three regions. Storage efficiency is therefore improved.

One consequence of the present example is that in the case of overlapping regions (as discussed above for the previous example), sequential accesses within overlapping regions (e.g. a higher region for one entry followed by a lower region for a different entry associated with an adjacent storage location) could lead to multiple accesses to a single storage structure. This could lead to a processing bottleneck. In order to address this, in one example, the pattern training circuitry comprises a storage structure to store the training entries. The storage structure comprises a plurality of banks, such that adjacent training entries (i.e. training entries corresponding to adjacent storage locations) are stored in different banks. For example, if entry tracks 3 regions, then in one such example any 3 consecutive entries are mapped to different banks. Because an access to a given region in such an example would potentially also update entries for the preceding region and the subsequent region, this ensures that any access bottleneck is averted. More generally, an example with N regions per entry may ensure that any N consecutive entries are mapped to different banks. Thus, the aforementioned sequential accesses within overlapping regions do not interfere with each other, reducing or eliminating the chance of a bottleneck.

In a further example, each said training entry comprises two regions including a lower region and a higher region. The lower region corresponds to negative offsets falling within an unaligned storage region adjacent to the given accessed storage location. The higher region corresponds to positive offsets falling within an unaligned storage region adjacent to the given accessed storage location.

Thus, a training entry as a whole covers a range of offsets around a given storage location. As the regions are unaligned, they can be sized to store a desired number of offsets and no more, such that there is no "wasted" space. This contrasts with the first example above in which a training entry comprises multiple aligned regions, in which a given entry may have unused space at the ends. However, a consequence of the unaligned nature of the present example is that the above-described efficient access, e.g. based on tag bits, cannot be performed. Instead, in order to determine if a given memory access matches a given training entry, a more complex address comparison is performed.

In one implementation of this example, each training entry has a size equal to a size of each pattern storage entry. Thus a given training entry can train all of the offsets of a corresponding pattern storage entry, without wasting space.

In an example, the apparatus further comprises prefetch circuitry. The prefetch circuitry predicts, following a data access and based on a pattern storage element corresponding to said access, data which is expected to be accessed in the future. The prefetch circuitry then fetches said predicted data. The apparatus can thus make use of the predictions to effectively prefetch data which is likely to be required in the near future.

In an example, the pattern training circuitry is configured to detect patterns of data access within a training window, and to perform the aforementioned transmitting to the prefetch pattern storage circuitry responsive to reaching the end of the training window. This can then be repeated. The confidence values of the prefetch pattern storage can thus be effectively updated over time, to provide accurate prefetching.

In an example, each training element is settable between a first value indicative of access associated with the respective offset, and a second value indicative of a lack of access. For example, each element may comprise a single bit, where a 0 indicates a lack of access and a 1 indicates at least one access. This provides an efficient way of tracking which offsets are accessed following a prior access to a given location.

For example, all elements may initially be set to the second value (indicating a lack of access). Over the course of a training window, the pattern training circuitry is responsive to an access associated with a given offset to set its associated training element to the first value. Thus, at the end of a training window, a given entry provides a record of which offsets were accessed. This can be used to update the confidence values in corresponding elements of the prefetch pattern storage circuitry. The pattern training circuitry may be responsive to the end of the training window to set all training elements back to the second value, after which the process repeats. This provides an effective way of tracking accesses and gradually updating the prefetch pattern storage circuitry, such that effective prefetching can be performed.

In an example, a pattern storage entry stores a number of negative offsets and the same number number of positive offsets. The regions of the pattern training circuitry may be equal in size to this number (size of single region of a training entry=number of negative offsets in a pattern storage entry=number of positive offsets in a pattern storage entry). This ensures that all relevant offsets can be tracked in a given training entry. For example, in the example above in which a training entry has a lower region, a central region and a higher region, even if the storage location in question is at the lowest end of the central region, all relevant negative offsets can be stored in the lower region.

Examples of the present disclosure will now be described with reference to the drawings.

FIG. 1 schematically shows an apparatus 100 according to an example. The apparatus 100 comprises prefetch pattern storage 105 and pattern training unit 110. These may be implemented in hardware, or as logical units of general-purpose processing circuitry. They may for example be components of a processor, such as a central processing unit or graphics processing unit.

The prefetch pattern storage comprises multiple pattern storage entries 115, which may for example form a pattern history table. One such entry is shown at 120. The entry corresponds to a particular location in memory (e.g. a particular cache line) and comprises location data indicative of this location (for example an address, or tag bits thereof). The entry 120 further comprises a number of values, some of which correspond to negative offsets relative to the particular location, and some of which correspond to positive offsets. Each value is a confidence value expressing a deemed likelihood that, following an access to the particular location, a subsequent access will be to a location having that offset. This information can be used to prefetch from locations which are deemed to be most likely, and thereby improve overall processing throughput.

The pattern training unit 110 comprises multiple training entries 125, which correspond to the pattern storage entries. There may be the same number of training entries 125 as pattern storage entries 115, as shown in FIG. 1. Alternatively, there may be a different number of training entries 125, e.g. representing a subset of the pattern storage entries 115.

One training entry is shown at 130. The entry 130 comprises information indicative of a particular location, for example an address or tag bits thereof. The entry 130 further comprises a number of elements, organised into two or more regions. The elements may be single bits, and each is associated with a given offset relative to the particular location. Following an access to the particular location, the elements are used to track subsequent accesses to locations having their associated offsets. Various ways of doing this are described in more detail below.

The prefetch pattern storage and pattern training unit are communicatively coupled. A given training entry is used to update the confidence values of a corresponding pattern storage entry, such that the confidence values are kept accurate and up-to-date.

Figure 2A:
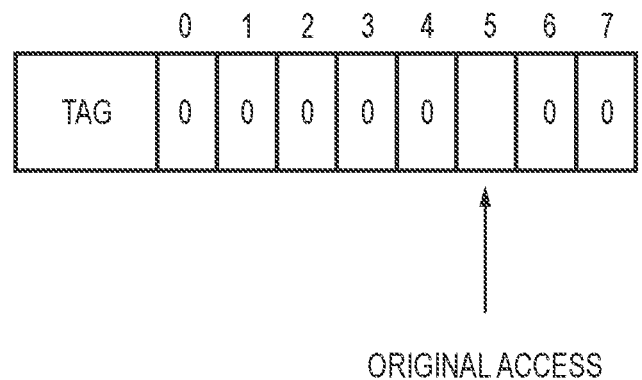
FIGS. 2A-2C illustrate a comparative example.
Figure 2B:
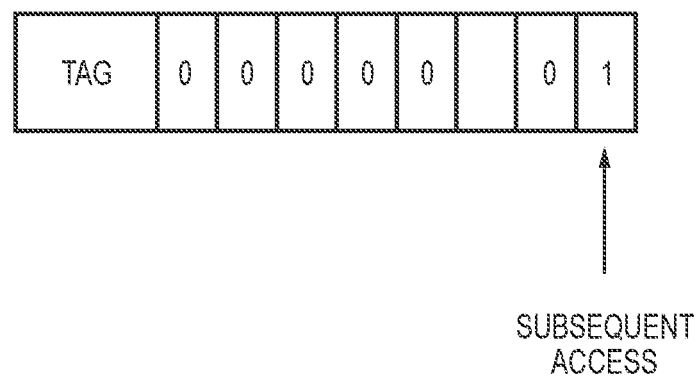
Figure 2C:
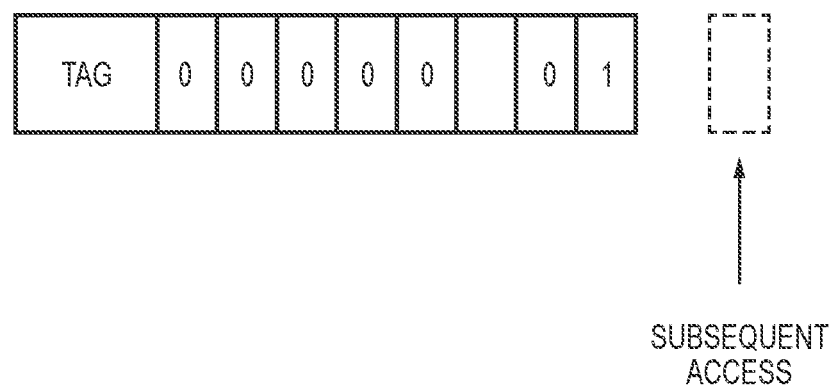

FIGS. 2A to 2C depict evolution of a training entry in a comparative example which does not implement the present disclosure. In this example, a training entry corresponds to a single aligned memory region having a size of 8 (i.e. 8 cache lines), and corresponds to a prefetch pattern storage entry (not shown) which stores confidence values corresponding to 7 positive offsets and 7 negative offsets. The training entry has 8 elements, each of which is a single bit, plus a tag field.

FIG. 2A shows a state of the training entry following an access to location 5 of the memory region to which the entry corresponds. The tag field stores tag bits corresponding to the accessed memory region: because the training entry corresponds to an aligned memory region, it can be efficiently represented by way of such tag bits. Bits 0-4 and 6-7 have zero values. No value is shown in bit 5, because this bit effectively corresponds to the accessed location to which the entry corresponds.

Bits 0-4 and 6-7 are used to track subsequent accesses to locations having given offsets relative to the originally accessed location. FIG. 2B shows a state of the training entry following a subsequent access to a cache line having an offset of +2 relative to the initial access: bit 7, corresponding to an offset of +2 relative to bit 5, has been set to 1.

FIG. 2C shows a state of the training entry at a later time, after an access to the original access location has been followed by an access to a cache line having an offset of +4 relative to the original access. It can be seen that the state has not changed: because the original access was relatively high in the memory region, there is no training entry element available to record an access with an offset of +4. This access is thus not tracked, and cannot be used to improve subsequent prefetching. This problem is particularly evident for accesses with relatively large offsets, which are more likely to fall outside the tracked region.

Various ways of implementing the training entries, according to examples of the present disclosure, will now be described.

Figure 3A:
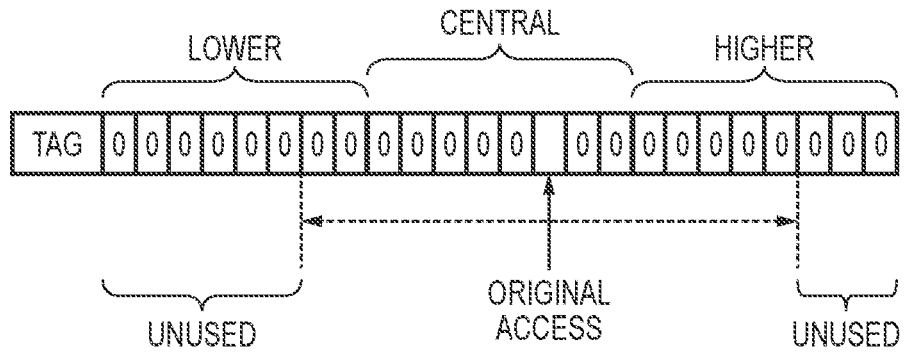
FIGS. 3A-3C illustrate an example training element configuration.

FIG. 3A depicts a training entry according to an example. In this example, the training entry comprises a tag field and three regions, which correspond to consecutive aligned memory regions centred on a central region containing the original access. The central region thus corresponds conceptually to the entry of FIG. 2A. As for FIG. 2A, the tag field comprises tag bits indicative of the central aligned memory region, which can efficiently represent the location of the central region.

Unlike FIG. 2A, the training entry comprises a lower region for offsets falling below the central region, and a higher region for offsets falling above the central region. Dotted arrows show the extent of the 7 positive offsets and 7 negative offsets associated with the example pattern history storage. It can be seen that, as a consequence of the addition of the lower and upper regions, the full range of offsets can be tracked. There are then some unused offsets at the lower and upper ends of the entry.

Figure 3B:
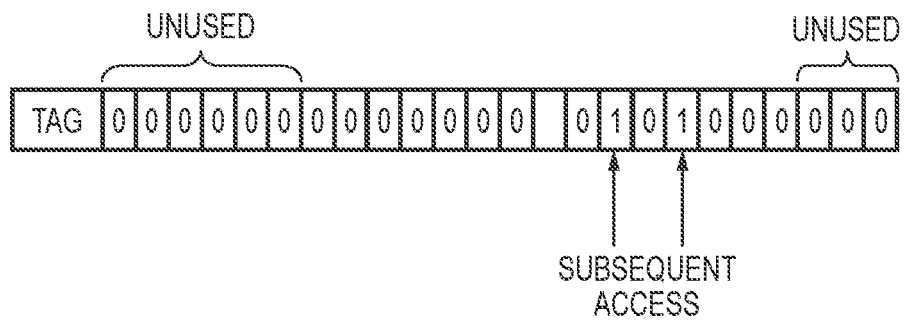

FIG. 3B shows the state of the training entry following the accesses described above in relation to FIGS. 2B and 2C: it can be seen that the accesses have been fully captured by the entry. This therefore provides for more accurate tracking, and thus more accurate prefetching.

Figure 3C:
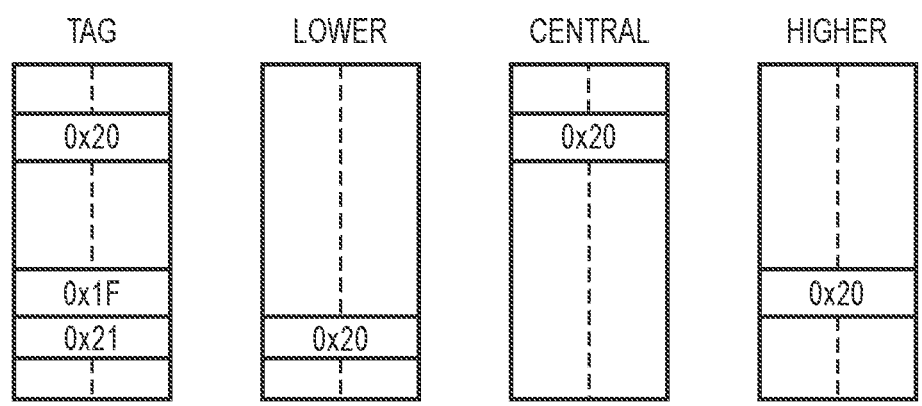

One potential consequence of the present example is that entries corresponding to overlapping regions (e.g. corresponding to initial accesses in adjacent memory regions, such that the central region of one entry will correspond to the lower or higher region of another). FIG. 3C depicts a data structure for storing the training entries mitigates an access bottleneck that might occur if such overlapping entries are to be accessed simultaneously or in quick succession.

In FIG. 3C, separate storage structures are provided for the lower, central and upper regions. The Figure shows how each of multiple consecutive entries can have overlapping regions. In this example, entries are shown for tag bits 0x1F, 0x20 and 0x21. It can be seen that each entry includes a region for 0x20: this is the higher region for the 0x1F entry, the central region for the 0x20 entry, and the lower region for the 0x21 entry. The regions are distributed across the storage structures such that if there is an access to the 0x20 region, each entry can be updated in parallel with no bottleneck.

Figure 4A:
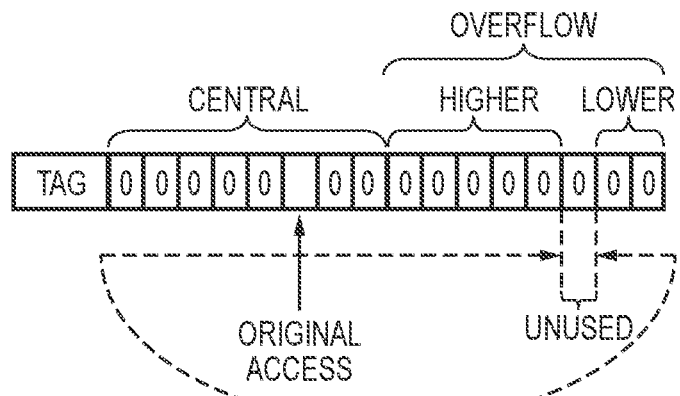
FIGS. 4A-4C illustrate an example training element configuration.

FIG. 4A depicts an alternative way in which training entries can be configured. In FIG. 4A, a given training entry comprises tag bits and a central region, which are essentially the same as those of FIG. 3A. However, where FIG. 3A had a lower region and an upper region, FIG. 4A has a single overflow region which includes elements for the higher offsets, and also for the lower offsets. In effect, the higher or lower offsets wrap around such that they are all stored in a single training entry.

This provides a reduction in storage relative to FIG. 3A, without losing the advantageousness of having regions corresponding to aligned memory regions and thereby being efficiently representable by way of tag bits. As can be seen, where an entry of FIG. 3A comprises three 8-bit regions, an entry of FIG. 4A comprises two regions. This reduction is possible because FIG. 4A does not have the unused bits of FIG. 3A.

Figure 4B:
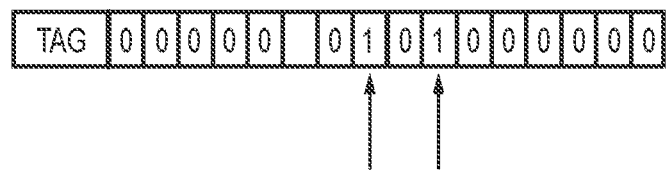

FIG. 4B depicts the state of the training entry following the accesses described in relation to FIGS. 2B, 2C and 3B. It can be seen that, as for FIG. 3B, the subsequent accesses are fully represented.

Figure 4C:
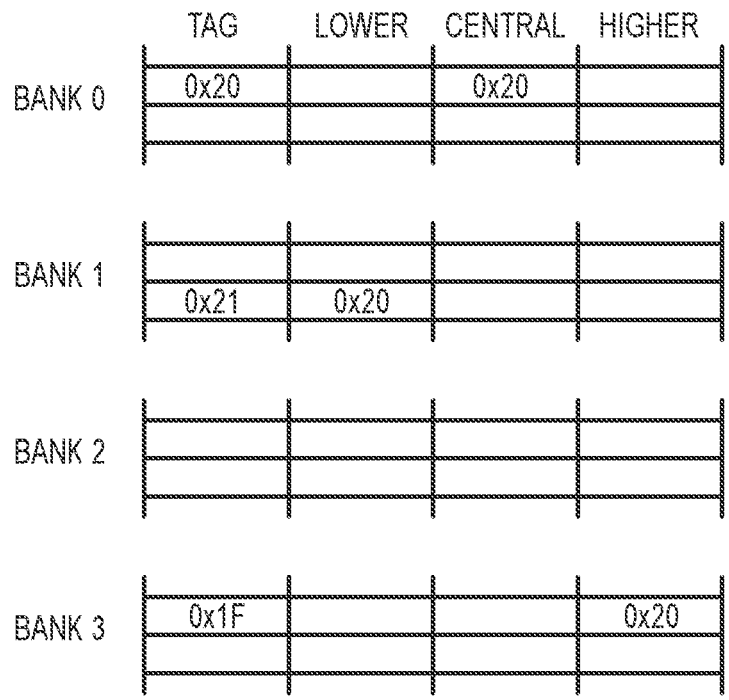

FIG. 4C depicts an advantageous storage structure for storing training entries according to FIG. 4A. It can be seen that the structure has four banks. All regions are stored together for each entry. However, even though three entries (0x1F, 0x20, 0x21) have a 0x20 region, these can be accessed simultaneously (or in quick succession) because they are in separate banks.

Figure 5A:
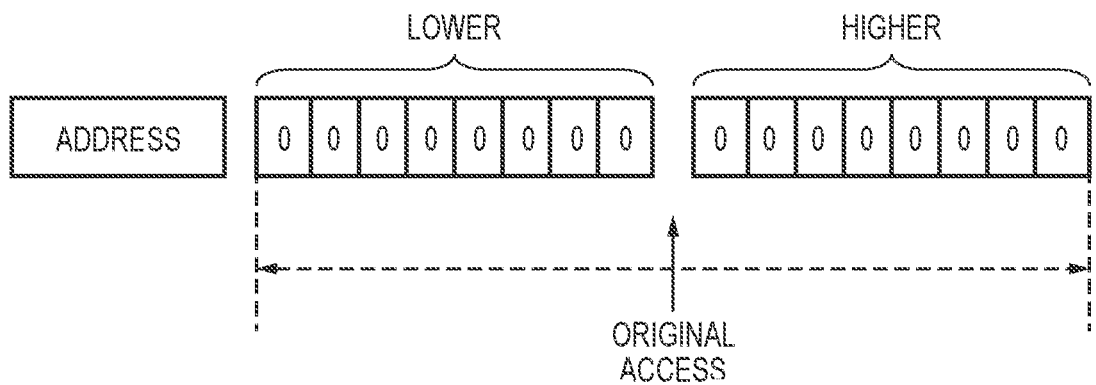
FIGS. 5A-5B illustrate an example training element configuration.

FIG. 5A depicts a third example configuration. In FIG. 5A, a given training entry has a lower region corresponding to an unaligned memory region with negative offsets relative to an original access, and a higher region corresponding to an unaligned memory region with positive offsets. These regions are sized to include the same number of offsets as an entry of the prefetch pattern storage. This example is thus very efficient in terms of storage usage. However, a consequence of the unaligned nature of the storage regions is that instead of storing tag bits to identify the location of the original access, a full address is stored instead. This increases the complexity of determining whether a given access corresponds to a given training entry: a comparison needs to be performed to see if a given access falls within the range of addresses associated with a given training entry, as opposed to simply checking the upper bits.

Figure 5B:
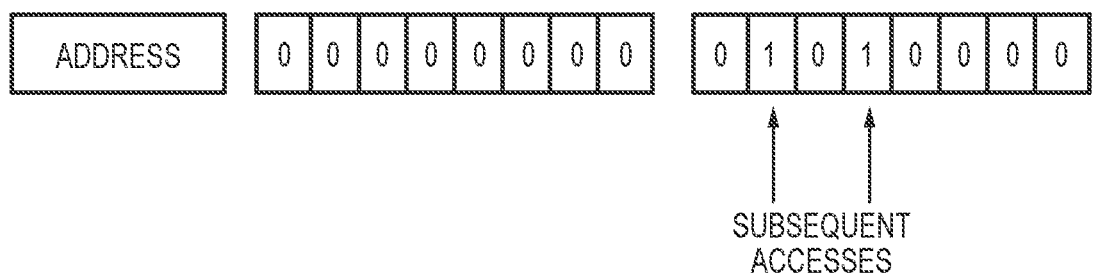

FIG. 5B then shows the state of the training entry after the previously-described accesses. As for FIGS. 3B and 4B, the subsequent accesses are fully represented with no loss of information.

Figure 6:
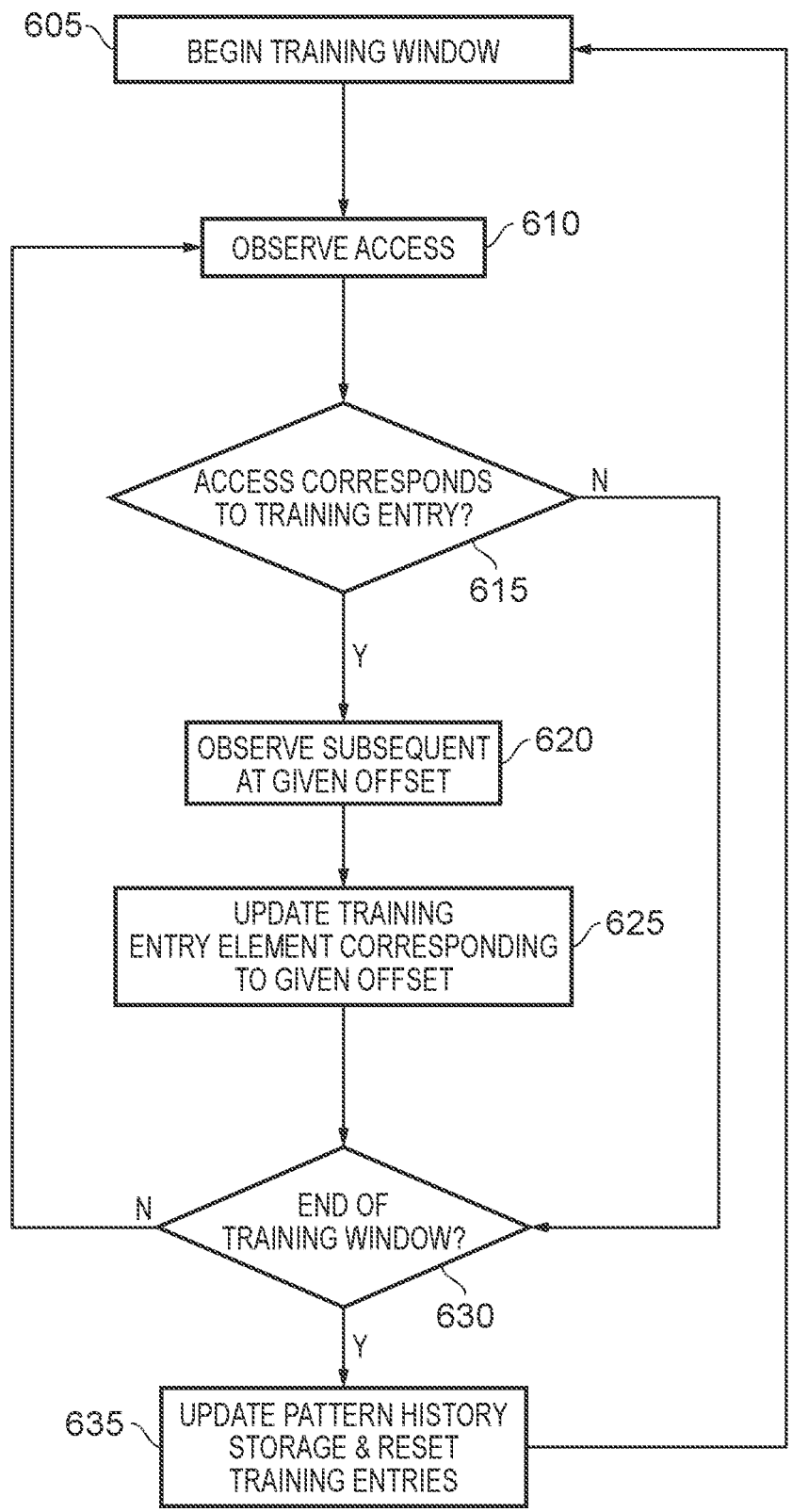
FIG. 6 depicts a method according to an example.

FIG. 6 illustrates a method according to an example of the present disclosure. The method provides a way of using the above-described training entries to update corresponding prefetch pattern storage entries.

At block 605, a training window is started. The training window may for example be expressed as a number of storage accesses.

At block 610, a storage access is observed.

At block 615, it is determined whether the access corresponds to a training entry.

If so, at block 620, a subsequent access is observed at a memory location having a given offset relative to the access of block 610. The corresponding training entry element is updated at block 625 to reflect the access (e.g. by setting it to a value of 1).

At block 630, it is determined whether the end of the training window has been reached. If not, flow returns to block 610.

If the end of the training window has been reached, flow proceeds to block 635 where the pattern history storage is updated based on the training entries. The training entries are then reset to initial value, and flow proceeds to block 605 where the method repeats.

Figure 7:
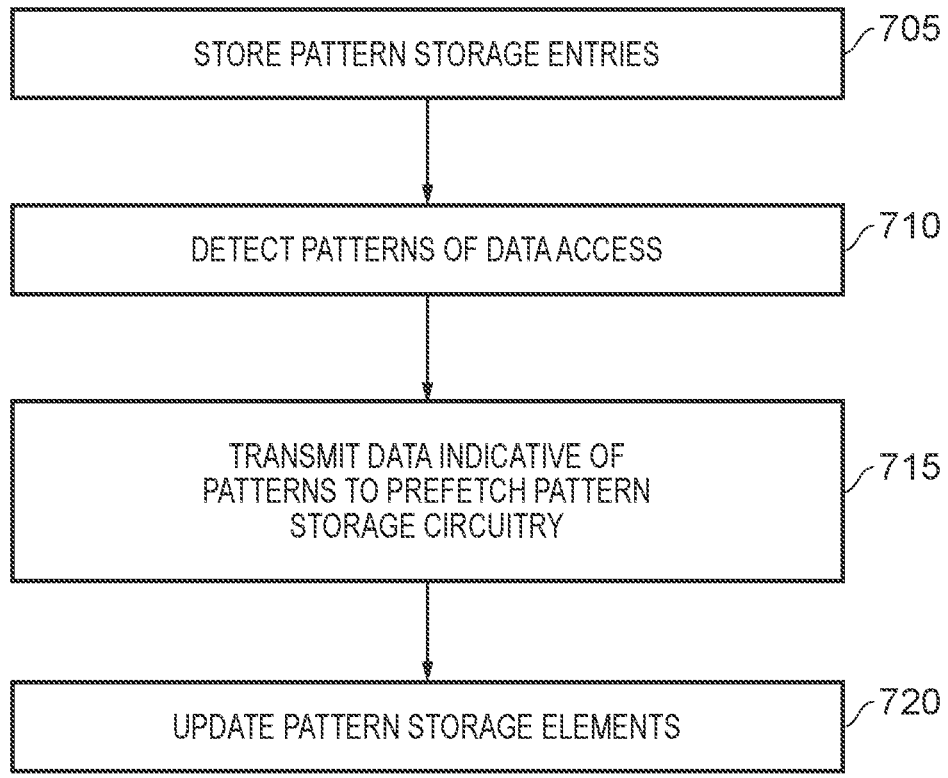
FIG. 7 depicts a method according to an example.

FIG. 7 depicts a method according to an example. The method may be implemented within the apparatus of claim 1.

At block 705, a plurality of pattern storage entries is stored by prefetch pattern storage circuitry. Each pattern storage entry is associated with respective storage location information, and comprises a plurality of confidence values. Each confidence value is representative of a confidence associated with an expected data access to a storage location having a respective offset relative to the respective storage location information, said expected data access being subsequent to a storage access corresponding to the respective storage location information.

At block 710, patterns of data access are detected by pattern training circuitry. The pattern training circuitry comprises a plurality of training entries, each training entry being associated with information indicative of a given accessed storage location. Each training entry comprises a plurality of regions, each region comprising a plurality of elements. Each said element is associated with a given storage location having a respective offset relative to the given accessed storage location and is configured to store information tracking accesses to said given storage location, said respective offsets comprising offsets from a given lowest offset to a given highest offset. For a given training entry, at least one region is configured to store information for which said offset is positive, and at least one region is configured to store information for which said offset is negative.

At block 715, data indicative of said information is transmitted from the pattern training circuitry to the prefetch pattern storage circuitry.

At block 720, responsive to receiving said transmitted data at the prefetch pattern storage circuitry, at least one corresponding pattern storage element is updated.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Figure 8:
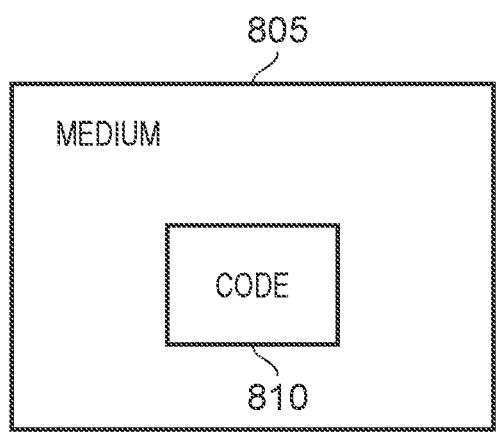
FIG. 8 depicts an example computer-readable medium.

FIG. 8 schematically depicts a computer-readable medium 805 as described above, storing computer-readable code 810 for fabricating an apparatus as described in the present disclosure.

Apparatuses and methods are thus provided for improved tracking of data accesses, and consequential improved prefetching performance.

From the above description it will be seen that the techniques described herein provides a number of significant benefits. In particular, a full range of offsets relative to a given initial access can be efficiently tracked.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:
1. An apparatus comprising:
prefetch pattern storage circuitry comprising a plurality of pattern storage entries, wherein each pattern storage entry:
is associated with respective storage location information; and
comprises a plurality of confidence values, each confidence value being representative of a confidence associated with an expected data access to a storage location having a respective offset relative to the respective storage location information, said expected data access being subsequent to a storage access corresponding to the respective storage location information,
pattern training circuitry to detect patterns of data access and to provide information representative of said detected patterns to the prefetch pattern circuitry for updating one or more corresponding pattern storage entries, wherein:
the pattern training circuitry comprises a plurality of training entries, each training entry being associated with information indicative of a given accessed storage location; and
each said training entry comprises a plurality of regions, each region comprising a plurality of elements, each said element being associated with a given storage location having a respective offset relative to the given accessed storage location and being configured to store information tracking accesses to said given storage location, said respective offsets comprising offsets from a given lowest offset to a given highest offset, wherein:
for a given training entry, at least one region is configured to store information for which said offset is positive, and at least one region is configured to store information for which said offset is negative; and
the pattern training circuitry is configured to transmit data indicative of said information to the prefetch pattern storage circuitry; and the prefetch pattern storage circuitry is responsive to receiving said transmitted data to update at least one corresponding pattern storage element.

2. An apparatus according to claim 1, wherein:
said plurality of regions each corresponds to a respective adjacent aligned storage region including a central aligned storage region comprising the given accessed storage location, said plurality of regions comprising:
a central region corresponding to offsets within the central aligned storage region;
at least one lower region corresponding to negative offsets falling within a lower one of said adjacent aligned storage regions; and
at least one higher region corresponding to positive offsets falling within a higher one of said adjacent aligned storage regions.

3. An apparatus according to claim 2, wherein the pattern training circuitry comprises:
a first storage structure for storing elements of the central region;
a second storage structure for storing elements of the lower region; and
a third storage structure for storing elements of the higher region.

4. An apparatus according to claim 3, wherein first storage structure, second storage structure and third storage structure are operable to be accessed in parallel across different entries.

5. An apparatus according to claim 1, wherein:
each said training entry comprises two regions, said two regions comprising:
a central region corresponding to offsets within a central aligned storage region comprising the given accessed storage location; and
an overflow region corresponding to offsets which fall within a lower or higher aligned storage region adjacent to the central aligned storage region.

6. An apparatus according to claim 5, wherein the pattern training circuitry comprises a storage structure to store said training entries, said storage structure comprising a plurality of banks such that adjacent ones of said training entries are stored in different ones of said banks.

7. An apparatus according to claim 1, wherein:
each said training entry comprises two regions including a lower region and an higher region;
the lower region corresponds to negative offsets falling within an unaligned storage region adjacent to the given accessed storage location; and
the higher region corresponds to positive offsets falling within an unaligned storage region adjacent to the given accessed storage location.

8. An apparatus according to claim 7, wherein each said training entry has a size equal to a size of each said pattern storage entry.

9. An apparatus according to claim 1, further comprising prefetch circuitry to:
predict, following a data access and based on a pattern storage element corresponding to said data access, data which is expected to be accessed in the future; and
prefetch said predicted data.

10. An apparatus according to claim 1, wherein each training element is settable between a first value indicative of access associated with the respective offset, and a second value indicative of a lack of access associated with the respective offset.

11. An apparatus according to claim 10, wherein the pattern training circuitry is responsive to an access associated with said respective offset to set said training element to the first value.

12. An apparatus according to claim 11, wherein the pattern training circuitry is responsive to an end of a training window to set all training elements to the second value.

13. An apparatus according to claim 10, wherein each said training element comprises a single bit.

14. An apparatus according to claim 1, wherein each region has a size equal to:
a number of negative offsets stored by a given pattern storage entry; and
a number of positive offsets stored by a given pattern storage entry.

15. An apparatus according to claim 1, wherein a range of offsets from said given lowest offset to said given highest offset encompasses a number of negative offsets stored by a given pattern storage entry and a number of positive offsets stored by a given pattern storage entry.

16. An apparatus according to claim 1, wherein each training element is associated with a given cache line, and an access to an address within said cache line is deemed to be an access associated with said respective offset.

17. An apparatus according to claim 1, wherein the pattern training circuitry is configured to perform said detecting patterns of data access within a training window, and to perform said transmitting responsive to reaching an end of the training window.

18. An apparatus according to claim 1, wherein the prefetch pattern storage circuitry implements a pattern history table, and the pattern training circuitry implements a training table.

19. A method comprising:
storing, by prefetch pattern storage circuitry, a plurality of pattern storage entries, wherein each pattern storage entry:
is associated with respective storage location information; and
comprises a plurality of confidence values, each confidence value being representative of a confidence associated with an expected data access to a storage location having a respective offset relative to the respective storage location information, said expected data access being subsequent to a storage access corresponding to the respective storage location information,
detecting, by pattern training circuitry, patterns of data access, wherein:
the pattern training circuitry comprises a plurality of training entries, each training entry being associated with information indicative of a given accessed storage location; and
each said training entry comprises a plurality of regions, each region comprising a plurality of elements, each said element being associated with a given storage location having a respective offset relative to the given accessed storage location and being configured to store information tracking accesses to said given storage location, said respective offsets comprising offsets from a given lowest offset to a given highest offset, wherein:
for a given training entry, at least one region is configured to store information for which said offset is positive, and at least one region is configured to store information for which said offset is negative;

transmitting data indicative of said information from the pattern training circuitry to the prefetch pattern storage circuitry; and responsive to receiving said transmitted data at the prefetch pattern storage circuitry, updating at least one corresponding pattern storage element.

20. A non-transitory computer-readable medium to store computer-readable code for fabrication of an apparatus comprising:

prefetch pattern storage circuitry comprising a plurality of pattern storage entries, wherein each pattern storage entry:
- is associated with respective storage location information; and
- comprises a plurality of confidence values, each confidence value being representative of a confidence associated with an expected data access to a storage location having a respective offset relative to the respective storage location information, said expected data access being subsequent to a storage access corresponding to the respective storage location information, pattern training circuitry to detect patterns of data access and to provide information representative of said detected patterns to the prefetch pattern circuitry for updating one or more corresponding pattern storage entries, wherein:

the pattern training circuitry comprises a plurality of training entries, each training entry being associated with information indicative of a given accessed storage location; and each said training entry comprises a plurality of regions, each region comprising a plurality of elements, each said element being associated with a given storage location having a respective offset relative to the given accessed storage location and being configured to store information tracking accesses to said given storage location, said respective offsets comprising offsets from a given lowest offset to a given highest offset, wherein:
 for a given training entry, at least one region is configured to store information for which said offset is positive, and at least one region is configured to store information for which said offset is negative; and the pattern training circuitry is configured to transmit data indicative of said information to the prefetch pattern storage circuitry; and the prefetch pattern storage circuitry is responsive to receiving said transmitted data to update at least one corresponding pattern storage element.

* * * * *